United States Patent
Freyhof et al.

(12) 
(10) Patent No.: US 11,209,065 B2
(45) Date of Patent: Dec. 28, 2021

(54) LOW TORSION BUSHING AND ASSEMBLY

(71) Applicant: Vibracoustic USA, Inc., South Haven, MI (US)

(72) Inventors: Shawn Freyhof, Hamilton, MI (US); Cory Lalonde, Saugatuck, MI (US)

(73) Assignee: Vibracoustic USA, Inc., South Haven, MI (US)

( * ) Notice: Subject to any disclaimer, the term of this patent is extended or adjusted under 35 U.S.C. 154(b) by 0 days.

(21) Appl. No.: 16/058,205

(22) Filed: Aug. 8, 2018

(65) Prior Publication Data

US 2019/0048957 A1    Feb. 14, 2019

Related U.S. Application Data (60) Provisional application No. 62/543,079, filed on Aug. 9, 2017.

(51) Int. Cl.
| | |
|---|---|
| *F16F 1/38* | (2006.01) |
| *F16C 11/12* | (2006.01) |
| *F16F 1/48* | (2006.01) |
| *F16C 11/04* | (2006.01) |
| *F16C 33/04* | (2006.01) |

(52) U.S. Cl.
CPC ............ *F16F 1/3835* (2013.01); *F16C 11/04* (2013.01); *F16C 11/12* (2013.01); *F16F 1/48* (2013.01); *F16C 33/04* (2013.01); *F16C 2202/02* (2013.01); *F16C 2202/08* (2013.01); *F16C 2208/10* (2013.01)

(58) Field of Classification Search
CPC .... F16F 1/3835; F16F 1/48; F16F 1/38; F16F 1/387; F16C 11/12; F16C 11/083; F16C 27/02; F16C 27/063; F16C 33/22; F16C 33/24; B60G 11/12

USPC ................................. 267/271, 270, 276, 273
See application file for complete search history.

(56) References Cited

U.S. PATENT DOCUMENTS

| | | | | |
|---|---|---|---|---|
| 1,827,268 A | * | 10/1931 | Short ..................... | B60G 11/12 267/270 |
| 2,227,307 A | * | 12/1940 | Hildabolt .............. | F16C 33/103 384/279 |
| 2,297,483 A | * | 9/1942 | Kuhne .................... | F16F 1/376 403/224 |
| 2,300,013 A | * | 10/1942 | Sampson .................. | F16F 1/38 403/226 |
| 2,343,585 A | * | 3/1944 | Schott ..................... | F16C 33/22 384/97 |

(Continued)

FOREIGN PATENT DOCUMENTS

EP          0272851 A2     6/1988

*Primary Examiner* — Robert A. Siconolfi
*Assistant Examiner* — James K Hsiao
(74) *Attorney, Agent, or Firm* — Fishman Stewart PLLC (57) ABSTRACT

A bushing includes a body and a plurality of lobes extending radially outward from the body. The plurality of lobes may include a first lobe, a second lobe, and a third lobe. The third lobe may include a material with a lower coefficient of friction than a material of the first lobe and the second lobe. A bushing assembly may include an inner member, an outer member disposed, and a bushing disposed at least partially between the inner member and the outer member. The bushing may include a first lobe, a second lobe, and a third lobe. The third lobe may include a material with a lower coefficient of friction than a material of the first lobe and the second lobe.

18 Claims, 7 Drawing Sheets

(56) References Cited

U.S. PATENT DOCUMENTS

| | | | | |
|---|---|---|---|---|
| 2,348,275 A * | 5/1944 | Aker | F16C 33/22 | 384/97 |
| 2,350,854 A * | 6/1944 | Whiteley | F16C 33/24 | 29/898.054 |
| 2,772,104 A * | 11/1956 | Thiry | F16F 1/3835 | 403/225 |
| 3,182,986 A * | 5/1965 | Brockman | F16F 1/3615 | 267/138 |
| 3,300,257 A * | 1/1967 | Selker | F16C 33/22 | 384/144 |
| 3,455,525 A * | 7/1969 | Waermo | F16F 1/3835 | 248/635 |
| 3,460,875 A * | 8/1969 | Kelley | F16C 17/14 | 384/97 |
| 3,616,876 A * | 11/1971 | Brooks | F16D 55/2262 | 188/73.45 |
| 3,831,920 A * | 8/1974 | Meldrum | B21D 55/00 | 267/137 |
| 4,101,181 A * | 7/1978 | Nakanishi | F16C 25/02 | 384/129 |
| 4,395,074 A * | 7/1983 | Haldimann | B62D 55/213 | 305/43 |
| 4,474,861 A * | 10/1984 | Ecer | B22F 3/1055 | 428/614 |
| 4,607,964 A * | 8/1986 | Kramer | F16C 33/24 | 384/98 |
| 4,671,676 A * | 6/1987 | Chen | F16C 17/026 | 384/100 |
| 4,768,761 A * | 9/1988 | Kramer | B29C 63/42 | 267/154 |
| 4,773,771 A * | 9/1988 | Kramer | F16C 17/14 | 384/125 |
| 4,886,324 A * | 12/1989 | Turner | B62D 55/0887 | 305/42 |
| 4,916,749 A * | 4/1990 | Urban | B60G 21/0551 | 384/125 |
| 5,000,586 A * | 3/1991 | Daxer | F16C 17/026 | 384/282 |
| 5,100,114 A | 3/1992 | Reuter et al. | | |
| 5,358,340 A * | 10/1994 | Bober | F16C 17/02 | 384/125 |
| 5,417,499 A * | 5/1995 | Jacques | F16C 33/20 | 384/298 |
| 5,492,415 A * | 2/1996 | Jordens | F16C 27/063 | 384/125 |
| 5,788,265 A | 8/1998 | McLaughlin | | |
| 6,105,944 A | 8/2000 | David | | |
| 6,170,812 B1 * | 1/2001 | Nicoles | F16F 1/38 | 267/141.2 |
| 6,202,995 B1 * | 3/2001 | Jou | B60G 7/04 | 267/140 |
| 6,412,762 B2 * | 7/2002 | de Fontenay | B60G 11/23 | 267/273 |
| 6,702,467 B2 | 3/2004 | Testroet | | |
| 7,165,909 B2 | 1/2007 | Buhl et al. | | |
| 7,500,685 B2 * | 3/2009 | Cai | B60G 21/0551 | 267/183 |
| 7,866,888 B2 * | 1/2011 | Hou | B22F 3/1025 | 384/100 |
| 8,037,573 B2 | 10/2011 | Bost, Jr. | | |
| 8,192,106 B2 | 6/2012 | Vogler et al. | | |
| 8,292,312 B2 | 10/2012 | Kato et al. | | |
| 8,491,194 B2 | 7/2013 | Hagan et al. | | |
| 8,579,510 B2 | 11/2013 | Noble et al. | | |
| 8,882,092 B2 * | 11/2014 | Jang | B60G 21/0551 | 267/141 |
| 8,888,082 B2 * | 11/2014 | Kang | B60G 21/0551 | 267/141 |
| 10,422,372 B2 * | 9/2019 | Cox | F16F 1/3863 | |
| 10,563,695 B2 * | 2/2020 | Farthing | F16C 33/121 | |
| 2002/0017750 A1 * | 2/2002 | Miyamoto | B60G 3/18 | 267/219 |
| 2003/0175073 A1 * | 9/2003 | Funke | B60G 21/0551 | 403/345 |
| 2003/0222384 A1 * | 12/2003 | Kato | F16F 1/3835 | 267/141.2 |
| 2004/0094880 A1 * | 5/2004 | Lee | F16F 7/00 | 267/141 |
| 2005/0025407 A1 * | 2/2005 | Wang | F16C 33/043 | 384/276 |
| 2005/0286821 A1 * | 12/2005 | Wagener | B60G 7/00 | 384/147 |
| 2006/0226622 A1 * | 10/2006 | Trotter | B60G 7/02 | 280/124.107 |
| 2007/0080031 A1 * | 4/2007 | Heuer | F16F 1/40 | 188/25 |
| 2007/0290425 A1 | 12/2007 | Heuer et al. | | |
| 2009/0179362 A1 * | 7/2009 | Ebert | F16F 1/3828 | 267/293 |
| 2010/0282547 A1 * | 11/2010 | Fischer | F16F 1/3835 | 188/71.1 |
| 2010/0322704 A1 | 12/2010 | Chen | | |
| 2011/0026862 A1 | 2/2011 | Bjoerkgard et al. | | |
| 2011/0188790 A1 * | 8/2011 | Eschweiler | F16F 13/14 | 384/99 |
| 2012/0114971 A1 * | 5/2012 | Andler | B22F 7/06 | 428/647 |
| 2012/0175831 A1 | 7/2012 | Kieffer | | |
| 2013/0119593 A1 * | 5/2013 | Konno | F16F 1/376 | 267/293 |
| 2013/0309522 A1 * | 11/2013 | Ito | C23C 14/022 | 428/596 |
| 2014/0367547 A1 * | 12/2014 | Ohnishi | F16F 1/36 | 248/638 |
| 2015/0167767 A1 * | 6/2015 | Nakamura | C10M 143/02 | 267/141 |
| 2015/0377312 A1 * | 12/2015 | Russell | F16F 1/38 | 384/125 |
| 2016/0221407 A1 * | 8/2016 | Molesworth | B60G 11/12 | |
| 2017/0051804 A1 | 2/2017 | Zimmerman et al. | | |
| 2017/0166025 A1 * | 6/2017 | Auten | B60G 11/12 | |
| 2018/0231088 A1 * | 8/2018 | Zimmerman | F16F 1/3842 | |
| 2018/0298948 A1 * | 10/2018 | Boeke | F16C 33/12 | |

* cited by examiner

LOW TORSION BUSHING AND ASSEMBLY

CROSS-REFERENCE TO RELATED APPLICATION

This application claims the benefit of U.S. Provisional Patent Application Ser. No. 62/543,079, filed on Aug. 9, 2017, the disclosure of which is hereby incorporated herein by reference in its entirety.

TECHNICAL FIELD

The present disclosure generally relates to bushings, including low torsion bushings that may be used, for example, in automotive and commercial vehicle applications.

BACKGROUND

This background description is set forth below for the purpose of providing context only. Therefore, any aspect of this background description, to the extent that it does not otherwise qualify as prior art, is neither expressly nor impliedly admitted as prior art against the instant disclosure.

Some bushings or bushing assemblies may include greater torsional stiffness than may be desirable.

There is a desire for solutions/options that minimize or eliminate one or more challenges or shortcomings of bushing assemblies. The foregoing discussion is intended only to illustrate examples of the present field and should not be taken as a disavowal of scope.

SUMMARY

In embodiments, a bushing may include a body and a plurality of lobes extending radially outward from the body. The plurality of lobes may include a first lobe, a second lobe, and a third lobe. The third lobe may include a material with a lower coefficient of friction than a material of the first lobe and the second lobe.

With embodiments, a bushing assembly may include an inner member, an outer member that may be disposed substantially coaxially with the inner member, and/or a bushing that may be disposed substantially coaxially with the inner tube and at least partially between the inner member and the outer member. The bushing may include a first lobe, a second lobe, and a third lobe. The third lobe may include a material with a lower coefficient of friction than a material of the first lobe and the second lobe The foregoing and other aspects, features, details, utilities, and/or advantages of embodiments of the present disclosure will be apparent from reading the following description, and from reviewing the accompanying drawings.

DETAILED DESCRIPTION

Reference will now be made in detail to embodiments of the present disclosure, examples of which are described herein and illustrated in the accompanying drawings. While the present disclosure will be described in conjunction with embodiments and/or examples, it will be understood that they are not intended to limit the present disclosure to these embodiments and/or examples. On the contrary, the present disclosure is intended to cover alternatives, modifications, and equivalents.

Figure 1:
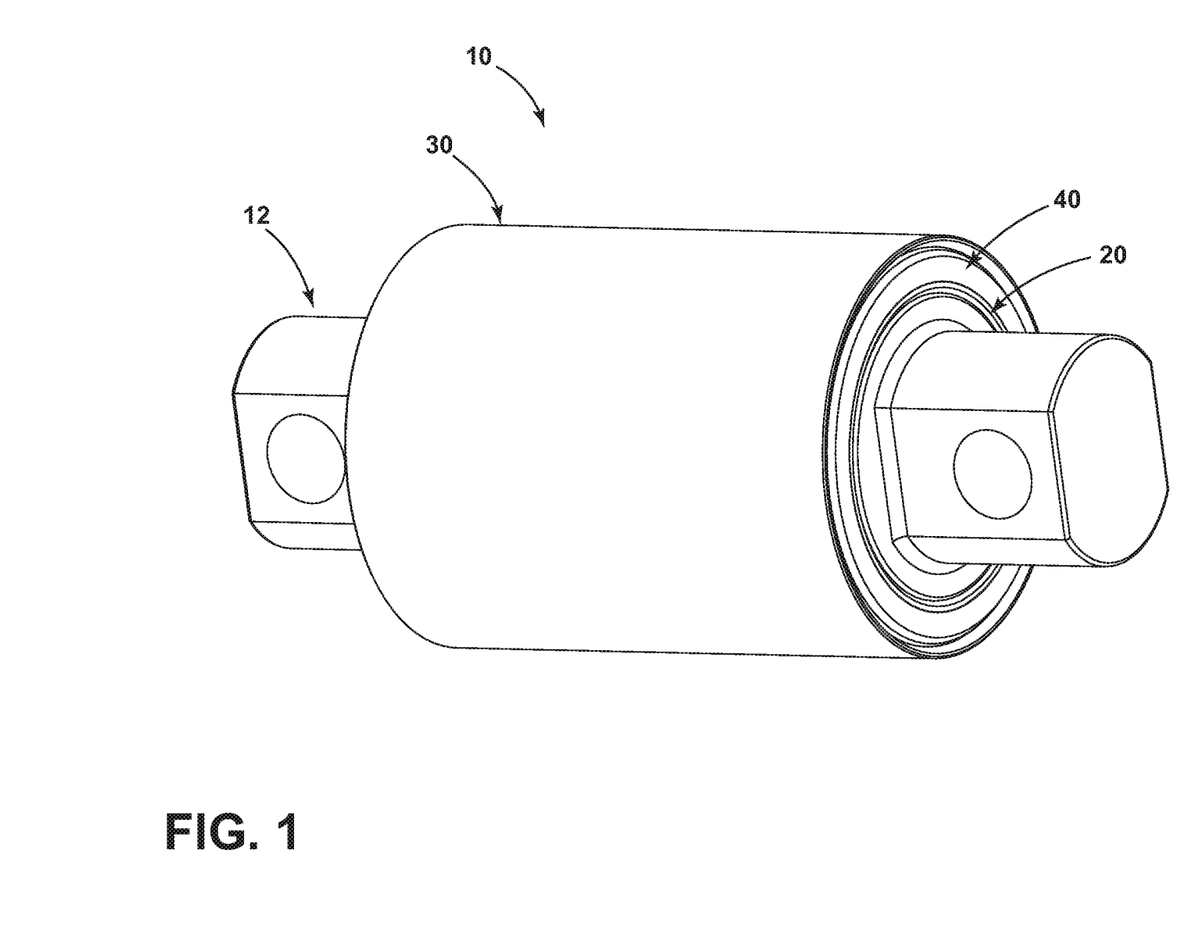
FIG. 1 is a perspective view generally illustrating an embodiment of a bushing assembly according to teachings of the present disclosure.
Figure 2:
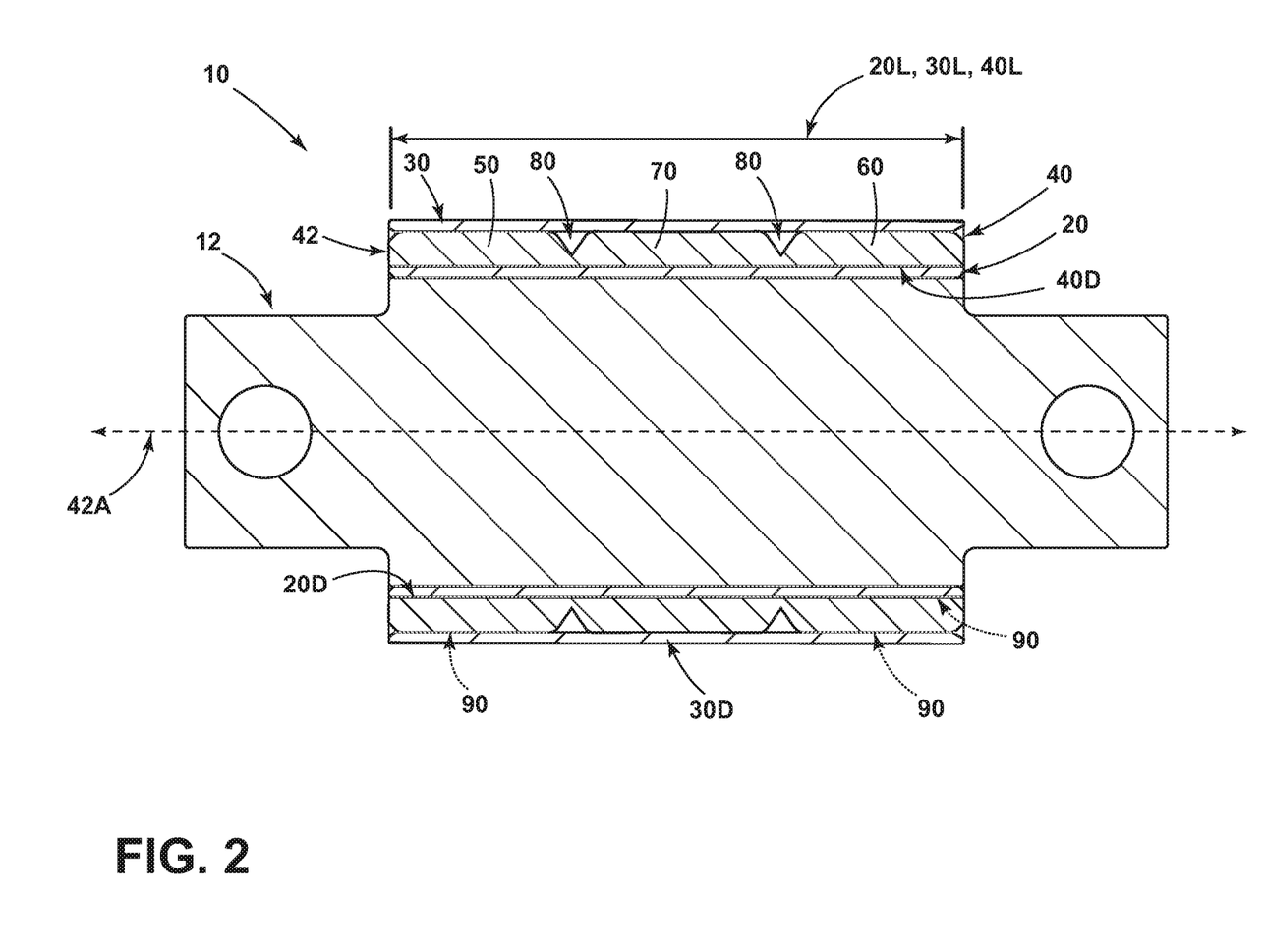
FIG. 2 is a cross-sectional view generally illustrating an embodiment of a bushing assembly according to teachings of the present disclosure.
Figure 3:
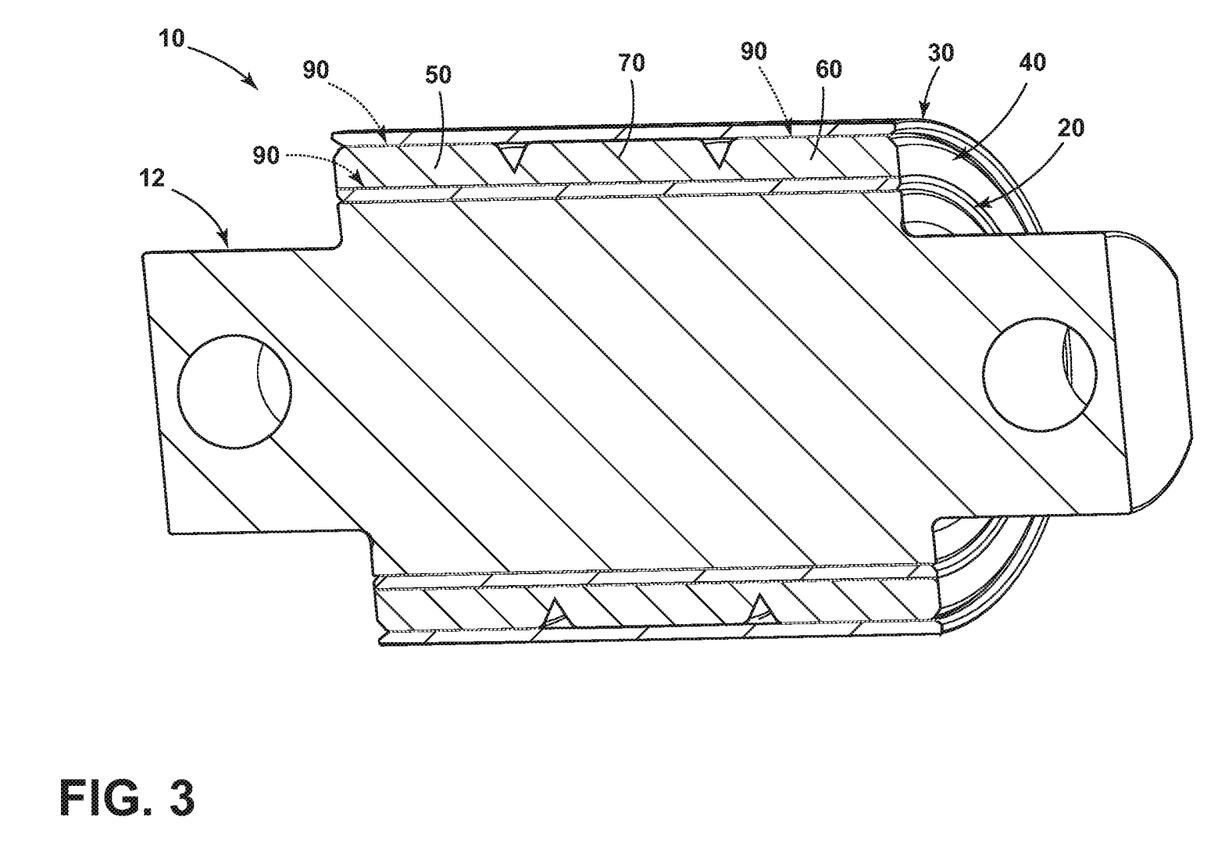
FIG. 3 is a cross-sectional perspective view generally illustrating portions of an embodiment of a bushing assembly according to teachings of the present disclosure.

In embodiments, such as generally illustrated in FIGS. 1, 2, and 3, a bushing assembly 10 may include a pin 12 (e.g., a bar pin), an inner member/tube 20, an outer member/tube 30, and/or a bushing 40. An inner tube 20 may be disposed at least partially around a pin 12, and may be connected to the pin 12 (e.g., bonded to the pin 12). A bushing 40 may be disposed at least partially around the inner tube 20. An outer tube 30 may be disposed at least partially around the bushing 40. Some or all of the pin 12, the inner tube 20, the outer tube 30, and the bushing 40, may be disposed coaxially with each other. An axial length 20L of the inner tube 20, an axial length 30L of the outer tube 30, and/or an axial length 40L of the bushing 40 may be substantially the same. The inner tube 20 and/or the outer tube 30 may include one or more metals. For example and without limitation, the inner tube 20 and/or the outer tube 30 may include zinc nickel.

Figure 4:
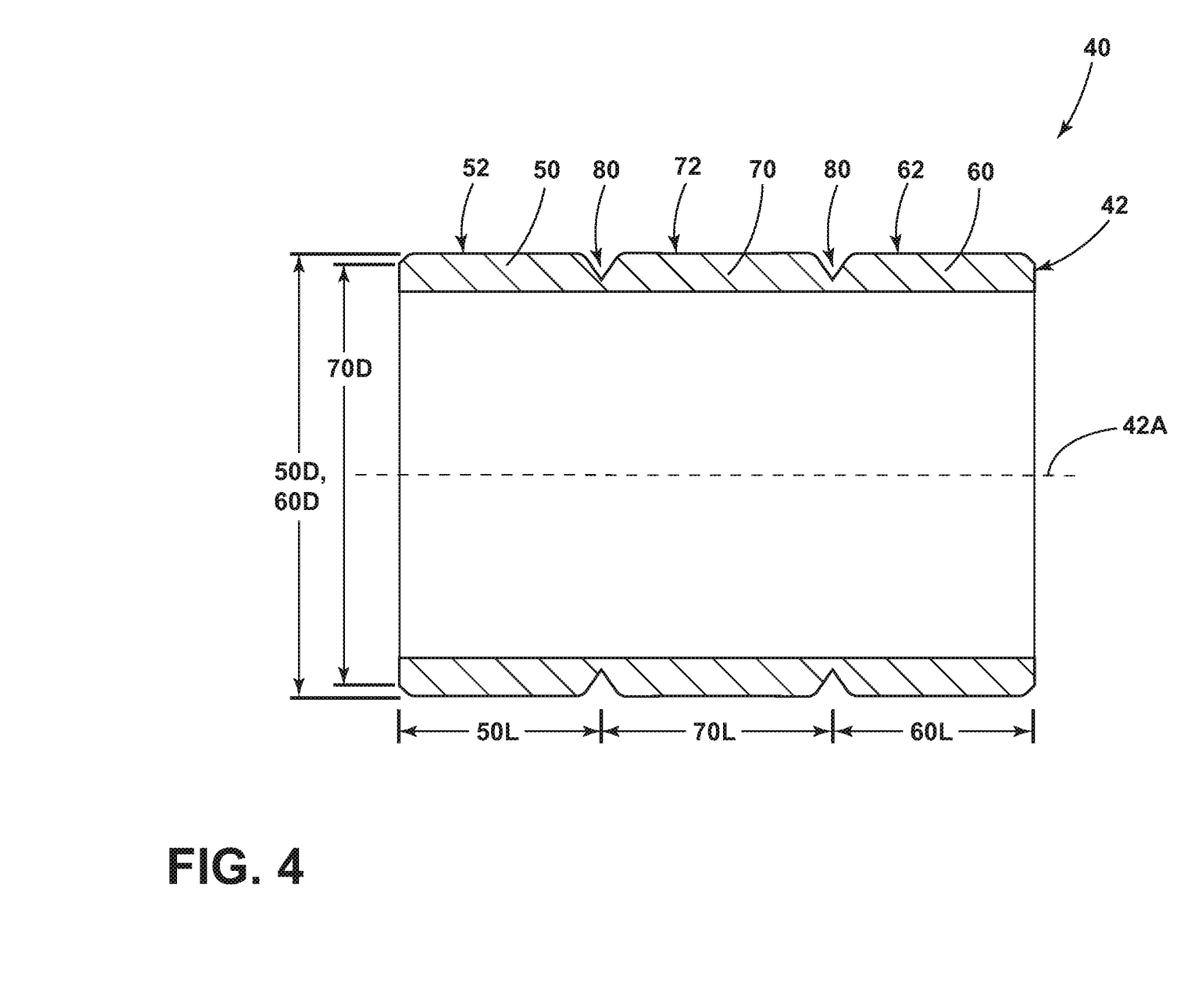
FIG. 4 is a cross-sectional view generally illustrating an embodiment of a bushing according to teachings of the present disclosure.
Figure 5:
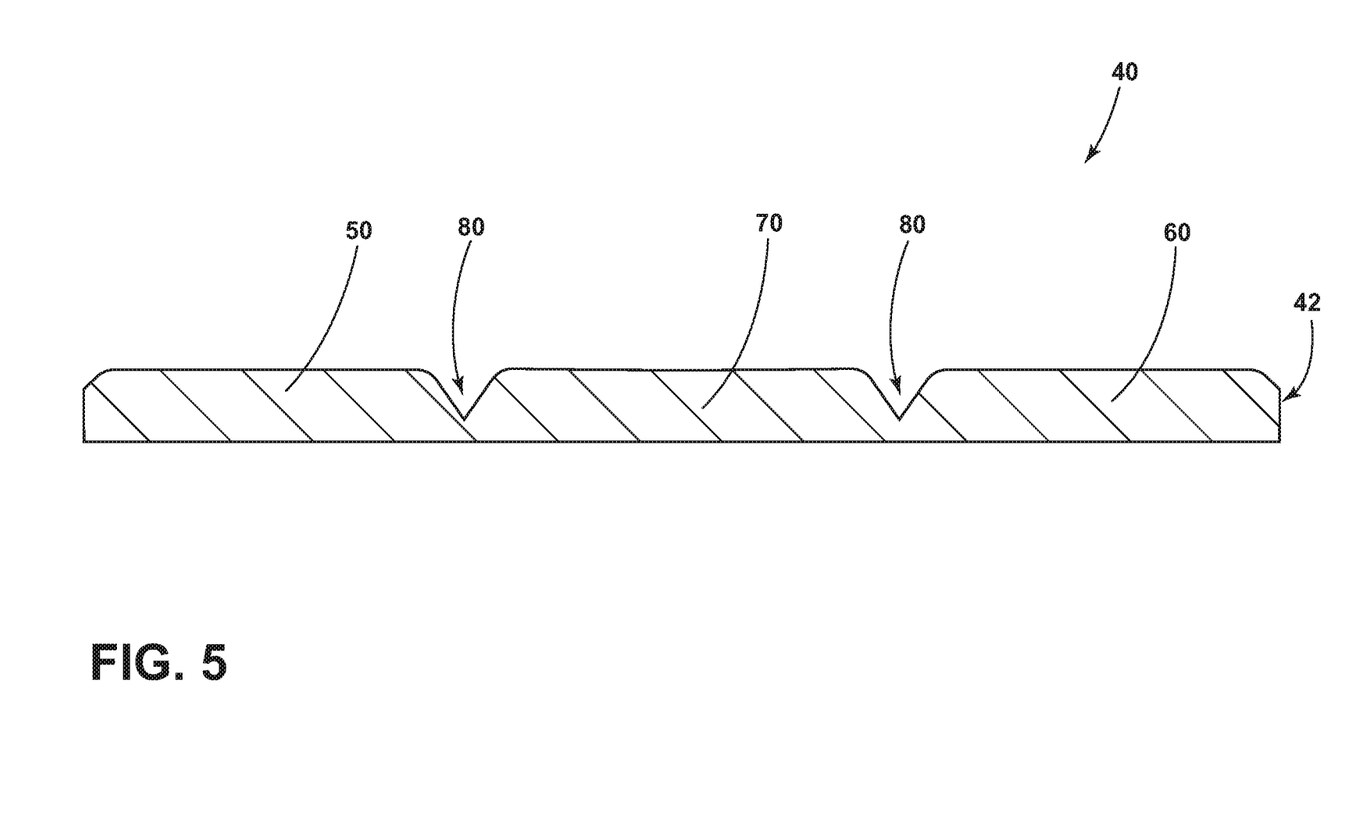
FIG. 5 is a cross-sectional view generally illustrating portions of an embodiment of a bushing according to teachings of the present disclosure.

With embodiments, such as generally illustrated in FIGS. 4 and 5, a bushing 40 may include a body 42 and one or more lobes, such as a first lobe 50, a second lobe 60, and/or a third lobe 70. The body 42 may be substantially cylindrical and/or may be substantially hollow (e.g., may include a tube-like configuration). The body 42 may include a central axis 42A. The first lobe 50, the second lobe 60, and/or the third lobe 70 may extend radially outward from the body 42. The third lobe 70 may be disposed axially between the first lobe 50 and the second lobe 60. An axial length 50L of the first lobe 50 and/or an axial length 60L of the second lobe 60 may be shorter than an axial length 70L of the third lobe 70. The axial lengths 50L, 60L, 70L, may correspond to a desired torsional stiffness of the bushing assembly 10. Increasing the axial length 50L and/or the axial length 60L (e.g., relative to the axial length 70L) may increase a torsional stiffness of the bushing assembly 10. Decreasing the axial length 50L and/or the axial length 60L (e.g., relative to the axial length 70L) may decrease a torsional stiffness of the bushing assembly 10.

In embodiments, a recess 80 may be disposed between adjacent lobes, such as between the first lobe 50 and the third lobe 70 and/or between the third lobe 70 and the second lobe 60. Recess(es) 80 may include, for example, a generally triangular shape (e.g., viewed in cross section).

In embodiments, an outer diameter 50D of the first lobe 50 and/or an outer diameter 60D of the second lobe 60 may be at least slightly larger than an outer diameter 70D of the third lobe 70. The first lobe 50, the second lobe 60, and/or the third lobe 70 may include generally trapezoidal cross-sectional shapes that may be widest (e.g., in an axial direction) closest to an inner diameter 40D of the body 42 and may taper away from body 42. The first lobe 50 and/or the second lobe 60 may be configured to be bonded with the outer tube 30, such as via an adhesive 90. The third lobe 70 may not be configured to be bonded with the outer tube 30 and may be configured to move (e.g., rotate) relative to the outer tube 30. For example and without limitation, the third lobe 70 may include a material with a lower coefficient of friction (e.g., friction modified rubber) than materials of the first lobe 50 and the second lobe 60. Friction modified rubber may, for example, include one or more additives that may decrease a coefficient of friction. The third lobe 70 may include one or more different materials than the first lobe 50 and the second lobe 60. An outer surface 72 of the third lobe 70 may include a lower coefficient of friction than outer surfaces 52, 62 of the first lobe 50 and/or the second lobe 60. It is noted that in embodiments, the third lobe 70 may be bonded with the outer tube 30, and the first lobe 50 and the second lobe 60 may be unbonded with the outer tube 30 and/or may be comprised of a material with a lower coefficient of friction (e.g., with respect to the third lobe 70).

In embodiments, a bushing 40 may be comprised of multiple rubber compounds with different coefficients of friction with some lobes (or portions thereof) that are bonded and other lobes (or portions thereof) that are not bonded to the outer tube 30 (which may be comprised of a metal). In an embodiment, a first lobe 50 and a second lobe 60 may be separated by a third lobe 70. The first lobe 50 and the second lobe 60 may be comprised of a regular or conventional rubber, and the third lobe 70 may be comprised of a rubber having a lower coefficient of friction than the first lobe 50 and the second lobe 60. For example, the third lobe 70 may comprise a friction modified rubber. With such a configuration, the third lobe 70—which may not be bonded to the outer tube 30 (and the metal thereof)—may permit a degree of slip under torsional loads. Such embodiments may provide a configuration that can lower the torsional stiffness of a bushing assembly 10 and may lower a moment in connection with a high torsional wind-up.

Figure 6:
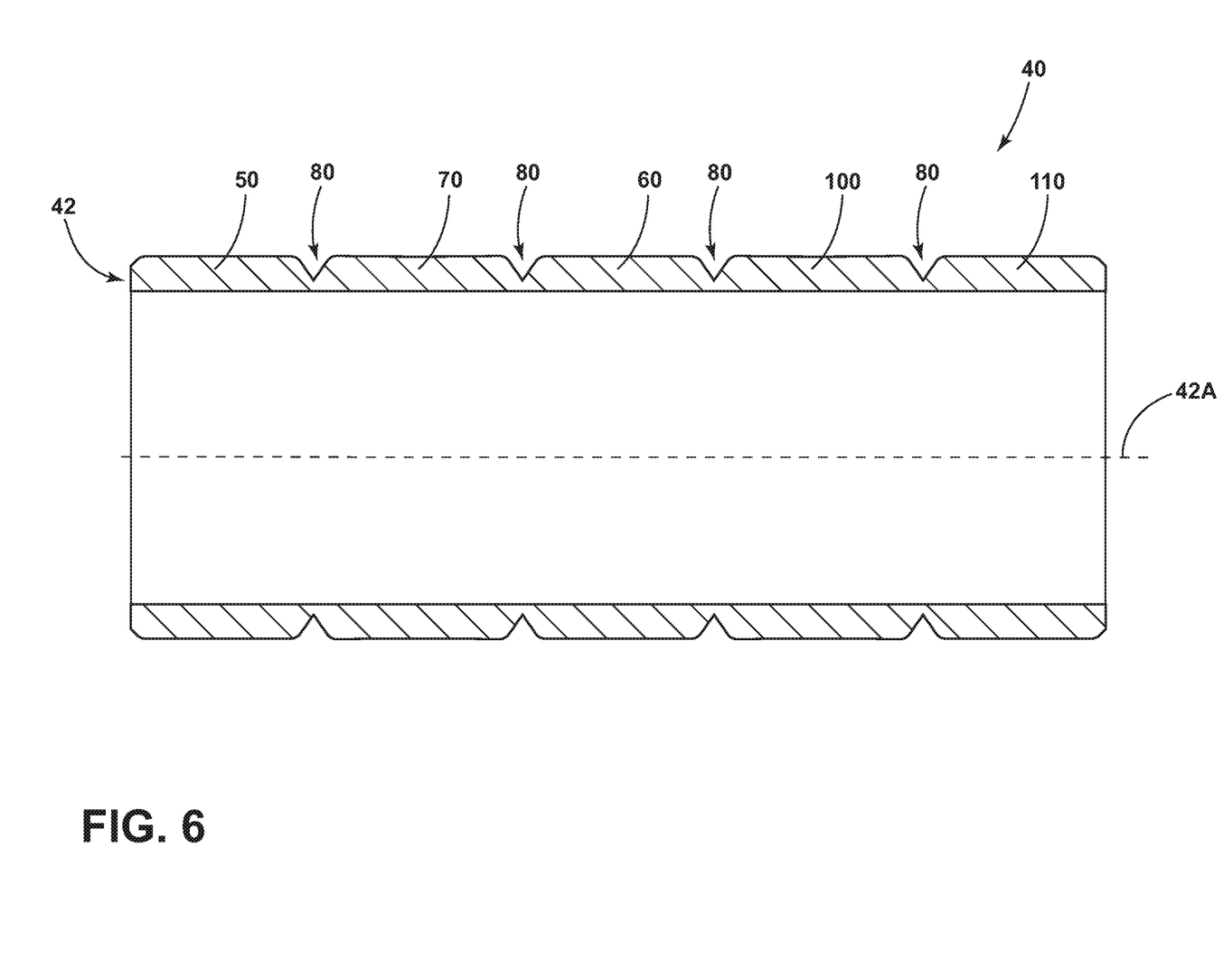
FIG. 6 is a cross-sectional view generally illustrating an embodiment of a bushing according to teachings of the present disclosure.
Figure 7:
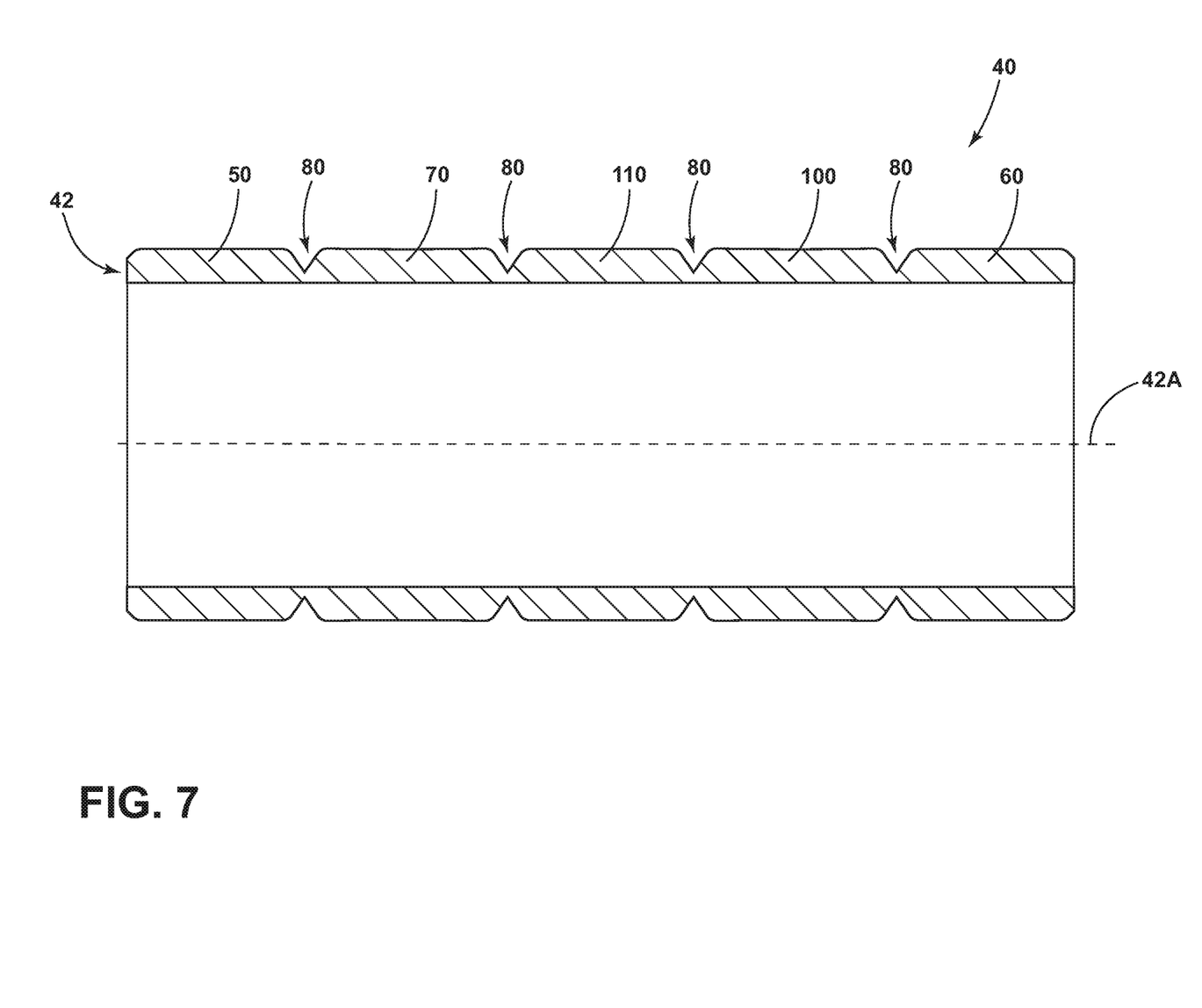
FIG. 7 is a cross-sectional view generally illustrating an embodiment of a bushing according to teachings of the present disclosure.

While embodiments of a bushing 40 may generally include a plurality of lobes, the concept is not limited to bushings 40 having three lobes. For example, with embodiments such as generally illustrated in FIGS. 6 and 7, a bushing assembly 10 may include a bushing 40 that may have more than three lobes. For example and without limitation, a bushing 40 may include a first lobe 50, a second lobe 60, a third lobe 70, a fourth lobe 100, and/or a fifth lobe 110. The first lobe 50, the second lobe 60, and/or the fifth lobe 110 may be configured to be bonded to an outer tube 30, such as via an adhesive 90 (see, e.g. FIG. 6). The third lobe 70 and/or the fourth lobe 100 may include a material with a lower coefficient of friction than a material or materials of the first lobe 50, the second lobe 60, and/or the fifth lobe 110, and may include a friction modified rubber. The third lobe 70 and/or the fourth lobe 100 may move (e.g., rotate), at least to some degree, relative to the outer tube 30, which may permit the inner tube 20 to move relative to the outer tube 30 and/or decrease a torsional stiffness of bushing assembly 10. The fourth lobe 100 may be disposed (e.g., axially) between the second lobe 60 and the fifth lobe 110 (e.g., bonded and non-bonded lobes may be disposed in an alternating configuration).

In embodiments, such as generally illustrated in FIG. 7, lobes bonded to the outer tube 30 may be disposed at axial ends of a bushing 40 and lobes not bonded to the outer tube may be disposed axially inward of the bonded lobes. For example and without limitation, the first lobe 50 and/or the second lobe 60 may be configured to be bonded to an outer tube 30, such as via an adhesive 90, while a third lobe 70, a fourth lobe 100, and/or a fifth lobe 110 may include a material with a lower coefficient of friction than a material or materials of the first lobe 50 and/or the second lobe 60. The third lobe 70, the fourth lobe 100, and/or the fifth lobe 110 may be disposed (e.g., axially) between the first lobe 50 and the second lobe 60. The fifth lobe 110 may be disposed between the third lobe 70 and the fourth lobe 100.

While embodiments with three lobes and five lobes have been described for illustration, a bushing 40 may include a different number of lobes (e.g., fewer lobes, more lobes).

In embodiments, a method of assembling a bushing assembly 10 may include providing a pin 12 and an inner tube 20. The inner tube 20 may be connected to the pin. A bushing 40 may be disposed at least partially around inner tube 20. An inner diameter 40D of the bushing 40 may be bonded to an outer diameter 20D of the inner tube 20, such as via an adhesive 90. An outer tube 30 may be disposed at least partially around the bushing 40 and/or the inner tube 20. Disposing the outer tube 30 around bushing 40 may include an inner diameter 30D of the outer tube 30 pressing (e.g., radially inward) on a first lobe 50, a second lobe 60, and/or a third lobe 70, which may deform the first lobe 50, the second lobe 60, and/or the third lobe 70. For example and without limitation, an inner diameter 30D of the outer tube 30 may be at least slightly smaller than the outer diameters 50D, 60D, 70D of the first lobe 50, the second lobe 60, and/or the third lobe 70. Deforming the first lobe 50, the second lobe 60, and/or the third lobe 70 may or may not involve compression, as the first lobe 50, the second lobe 60, and/or the third lobe 70 may include a substantially incompressible material (e.g., deformation may include flowing/reshaping of an incompressible material). In embodiments, the first lobe 50 and/or the second lobe 60 may be deformed to a greater degree than third lobe 70, such as if the first lobe 50 and/or the second lobe 60 include greater outer diameters 50D, 60D than an outer diameter 70D of the third lobe 70. Deformation of the first lobe 50, the second lobe 60, and/or the third lobe 70 may include changing the shape and/or size of a recess 80 between adjacent lobes. For example and without limitation, a size of a recess or recesses 80 between the first lobe 50 and the third lobe 70 and/or between the third lobe 70 and the second lobe 60 may decrease in size by half or more upon connection of the outer tube 30 with the bushing 40.

In embodiments, the first lobe 50 and/or the second lobe 60 (and/or the fifth lobe 110) may be bonded with the outer tube 30 such that the first lobe 50 and/or the second lobe 60 may not move relative to the outer tube 30. Bonding the first lobe 50 and/or the second lobe 60 (and/or the fifth lobe 110) with the outer tube 30 may restrict relative axial movement between the bushing 40, the outer tube 30 and/or the inner tube 20. The third lobe 70, the fourth lobe 100 and/or the fifth lobe 110 may not be bonded to the outer tube 30 and may be configured to move relative to the outer tube 30 at least to some degree, which may permit, for example, the inner tube 20 to move relative to the outer tube 30, at least to some degree. A bushing assembly 10 with such a third lobe 70 may, for example, include a reduced torsional stiffness compared to other bushing assemblies in which a bushing 40 is completely bonded to an outer tube 30.

With embodiments, a bushing 40 (e.g., including a body 42 and any lobes) may, for example and without limitation, be monolithic (e.g., a single, unitary component).

In embodiments, a bushing assembly 10 may be utilized, for example, in connection with an axle beam rod.

Various embodiments are described herein for various apparatuses, systems, and/or methods. Numerous specific details are set forth to provide a thorough understanding of the overall structure, function, manufacture, and use of the embodiments as described in the specification and illustrated in the accompanying drawings. It will be understood by those skilled in the art, however, that the embodiments may be practiced without such specific details. In other instances, well-known operations, components, and elements have not been described in detail so as not to obscure the embodiments described in the specification. Those of ordinary skill in the art will understand that the embodiments described and illustrated herein are non-limiting examples, and thus it can be appreciated that the specific structural and functional details disclosed herein may be representative and do not necessarily limit the scope of the embodiments.

Reference throughout the specification to "various embodiments," "with embodiments," "in embodiments," or "an embodiment," or the like, means that a particular feature, structure, or characteristic described in connection with the embodiment is included in at least one embodiment. Thus, appearances of the phrases "in various embodiments," "with embodiments," "in embodiments," or "an embodiment," or the like, in places throughout the specification are not necessarily all referring to the same embodiment. Furthermore, the particular features, structures, or characteristics may be combined in any suitable manner in one or more embodiments. Thus, the particular features, structures, or characteristics illustrated or described in connection with one embodiment/example may be combined, in whole or in part, with the features, structures, functions, and/or characteristics of one or more other embodiments/examples without limitation given that such combination is not illogical or non-functional. Moreover, many modifications may be made to adapt a particular situation or material to the teachings of the present disclosure without departing from the scope thereof.

It should be understood that references to a single element are not necessarily so limited and may include one or more of such element. Any directional references (e.g., plus, minus, upper, lower, upward, downward, left, right, leftward, rightward, top, bottom, above, below, vertical, horizontal, clockwise, and counterclockwise) are only used for identification purposes to aid the reader's understanding of the present disclosure, and do not create limitations, particularly as to the position, orientation, or use of embodiments.

Joinder references (e.g., attached, coupled, connected, and the like) are to be construed broadly and may include intermediate members between a connection of elements and relative movement between elements. As such, joinder references do not necessarily imply that two elements are directly connected/coupled and in fixed relation to each other. The use of "e.g." in the specification is to be construed broadly and is used to provide non-limiting examples of embodiments of the disclosure, and the disclosure is not limited to such examples. Uses of "and" and "or" are to be construed broadly (e.g., to be treated as "and/or"). For example and without limitation, uses of "and" do not necessarily require all elements or features listed, and uses of "or" are intended to be inclusive unless such a construction would be illogical.

While processes, systems, and methods may be described herein in connection with one or more steps in a particular sequence, it should be understood that such methods may be practiced with the steps in a different order, with certain steps performed simultaneously, with additional steps, and/or with certain described steps omitted.

It is intended that all matter contained in the above description or shown in the accompanying drawings shall be interpreted as illustrative only and not limiting. Changes in detail or structure may be made without departing from the present disclosure.

What is claimed is:

1. A bushing, comprising:
a body; and
a plurality of lobes extending radially outward from the body, the plurality of lobes including a first lobe, a second lobe, and a third lobe;
wherein the first lobe and the second lobe are comprised of rubber, and the material of the third lobe includes friction modified rubber that has a lower coefficient of friction than the rubber of the first lobe and the second lobe.

2. The bushing of claim 1, including a first recess disposed between the third lobe and the first lobe, and including a second recess disposed between the third lobe and the second lobe.

3. The bushing of claim 2, wherein, in cross section, at least a portion of the first recess or the second recess has a generally triangular shape.

4. The bushing of claim 1, wherein an outer diameter of the third lobe is smaller than an outer diameter of the first lobe and an outer diameter of the second lobe.

5. The bushing of claim 1, wherein an axial length of the first lobe and an axial length of the second lobe are shorter than an axial length of the third lobe.

6. The bushing of claim 1, wherein the third lobe is disposed axially between the first lobe and the second lobe.

7. The bushing of claim 1, wherein the plurality of lobes includes a fourth lobe and a fifth lobe.

8. The bushing of claim 7, wherein at least one of the fourth lobe and the fifth lobe includes a lower coefficient of friction than the first lobe.

9. The bushing of claim 7, wherein at least one of the fourth lobe and the fifth lobe includes friction modified rubber.

10. The bushing of claim 7, wherein the at least one of the fourth lobe and the fifth lobe is disposed axially between the first lobe and the second lobe.

11. A bushing assembly, comprising:
an inner member;
an outer member; and
a bushing disposed at least partially between the inner member and the outer member, the bushing including a first lobe, a second lobe, and a third lobe;
wherein material properties of the third lobe have a lower coefficient of friction than material properties of the first lobe and the second lobe, the bushing is disposed in a deformed state between the inner member and the outer member, and the first lobe and the second lobe are deformed to a greater degree than the third lobe.

12. The bushing assembly of claim 11, wherein the bushing includes a first recess disposed between the third lobe and the first lobe, and the bushing includes a second recess disposed between the third lobe and the second lobe.

13. The bushing assembly of claim 11, wherein the outer member includes zinc nickel.

14. The bushing assembly of claim 11, wherein the bushing includes an incompressible material; and the bushing is pressed between the inner member and the outer member.

15. The bushing assembly of claim 11, wherein axial lengths of the first lobe, the second lobe, and the third lobe correspond to a torsional stiffness of the bushing assembly.

16. The bushing assembly of claim 11, wherein an axial length of the third lobe is longer than axial lengths of the first lobe and the second lobe.

17. A bushing assembly, comprising:

an inner member;

an outer member; and a bushing disposed at least partially between the inner member and the outer member, the bushing including a first lobe, a second lobe, and a third lobe;

wherein material properties of the third lobe have a lower coefficient of friction than material properties of the first lobe and the second lobe, wherein the first lobe and the second lobe are bonded to the outer member, and the third lobe is not bonded to the outer member.

18. The bushing assembly of claim 17, wherein the first lobe and the second lobe are bonded to the outer member via an adhesive.

* * * * *